United States Patent [19]

McDonough et al.

[11] 4,069,059
[45] Jan. 17, 1978

[54] SILICON NITRIDE-ZIRCONIUM SILICATE CERAMICS

[75] Inventors: William J. McDonough; Roy W. Rice, both of Alexandria, Va.

[73] Assignee: The United States of America as represented by the Secretary of the Navy, Washington DC

[21] Appl. No.: 695,296

[22] Filed: June 11, 1976

[51] Int. Cl.$^2$ .............................................. C04B 35/58
[52] U.S. Cl. ........................................ 106/57; 106/43; 106/73.5; 264/65
[58] Field of Search .................. 106/43, 57, 73.5, 55, 106/69; 423/344; 264/65

[56] References Cited

U.S. PATENT DOCUMENTS

| 3,352,637 | 11/1967 | Heymer et al. | 423/344 |
| 3,409,417 | 11/1968 | Yates | 29/182.5 |
| 3,811,928 | 5/1974 | Henney et al. | 106/69 |

OTHER PUBLICATIONS

Terwilliger, G. R. et al., "Hot-Pressing Behavior of $Si_3N_4$," J. Am. Cer. Soc., 57 (1), pp. 25-29., Jan. 1974.
Mitomo, M. et al., "Sintering of $Si_3N_4$" Ceramic Bull. 55 (3), 1976, p. 313.
Deeley, G. G. et al., "Dense Silicon Nitride," Powd. Met. 8 (1961), pp. 145-151.
Rice, R. W. et al., "Zirconia Additions to Hot Pressed Silicon Nitride" Chem. Abstracts, 83 (1975), item 119987f.
Rice, R. W. et al., "Hot-Pressed $Si_3N_4$ with ZR-Based Additions" J. Am. Cer. Soc. 58 (5-6), 1975, p. 264.
Crandall, W. B. et al., "Preparation and Evaluation of Si—Al—O—N" IIT Research Institute-Report AD-—A021997 for Aerospace Research Labs., June 1973 (pub. by N.T.I.S.), pp. 8-10.

Primary Examiner—Helen M. McCarthy
Attorney, Agent, or Firm—R. S. Sciascio; Philip Schneider; Thomas McDonnell

[57] ABSTRACT

A dense and high temperature-oxidation-resistant ceramic prepared from silicon nitride and zirconium silicate in an amount from 3 to 15 weight percent of silicon nitride.

1 Claim, No Drawings

SILICON NITRIDE-ZIRCONIUM SILICATE CERAMICS

BACKGROUND OF THE INVENTION

The present invention relates generally to ceramics and more particularly to silicon nitride structural ceramics.

Pure silicon nitride ($Si_3N_4$) is a material with great structural strength and resistance to high temperature. Processing this material is unfortunately difficult.

A widely used technique to make silicon nitride more processable is the addition of a small quantity of certain metal oxides such as magnesium oxide (MgO) or aluminum oxide ($Al_2O_3$). Since silicon nitride oxidizes, a minute layer of silicon oxide is found on this material. It is believed that the oxide additives combine with the silicon oxide coating to form bonding silicates which then control the high temperature creep and deformation behavior.

The strength of the ceramic depends much on the strength of the bonding silicates. Creep-resistance of the composition is destroyed when the bonding silicates begin to soften as they approach their melting temperatures of $\geq 1400°$ C. Investigation has shown that certain impurities interfere with the refractory character of the bonding silicate. Consequently research in increasing the high temperature properties of silicon nitride have generally proceeded along two approaches. With the first approach the effort is on decreasing the impurities in the ingredients and the processing, whereas the second approach seeks to develop additives which would produce a more refractory bonding silicate or other refractory bonding phase. The most promising example of the second approach is the additive, yttrium oxide ($Y_2O_3$). The resulting bonding silicate has a melting point of almost 2000° C, a higher density, and a high strength. However, $Y_2O_3$ is expensive, and unusual detrimental or destructive oxidation effeects have been found in $Si_3N_4$ made with $Y_2O_3$.

SUMMARY OF THE INVENTION

It is therefore an object of this invention to provide additives to improve the refractory properties of silicon nitride.

Another object of this invention is to provide a high density refractory material.

These and other objects are achieved by compounding silicon nitride with an additive selected from the class consisting of zirconium carbide, zirconium nitride, zirconium silicate, and mixtures thereof in an amount from 1 to 25 weight percent of the weight of silicon nitride thereby obtaining a bonding phase with a higher melting point and oxidation resistance.

DETAILED DESCRIPTION OF THE INVENTION

The additives of this invention are zirconium nitride, zirconium carbide, zirconium silicate, and mixtures thereof. It is preferred that the additives are of reagent grade and have a particle size equal to or less than the particle size of the $Si_3N_4$. The silicon nitride is preferably comparable with the additives in purity and should have a particle size of about 1$\mu$m or less. Although an amount from 1 to 25 weight percent of an additive of this invention may be compounded with silicon nitride, it is preferred that an amount from 3 to 15 weight percent of the weight of silicon nitride is compounded with silicon nitride to produce the high melting point and oxidation resistant ceramics of the present invention. The optimum selection of the amount of additive depends on a balance of properties desired.

In order to demonstrate the utility and superior qualities of the ceramics of this invention, numerous samples were prepared and tested. The samples were prepared by a method comprising the step of adding silicon nitride and an additive to a WC quart ⅓ full of WC balls of 0.25-inch in diameter and containing 100 ml of t-butanol per 25g of sample, wet ball-milling the mixtures for 5 hours at 80 rpm, and uniaxially hot pressing the mixture at a temperature from 1750° C to 1850° C with a pressure of 5000 psig in a flowing nitrogen atmosphere for 2 hours.

Table I summarizes the structural strength of aforedescribed ceramic-powder samples.

TABLE I

| Additive | wt. % added | No. of Sample | Fracture Energy ($J/M^2$) | | Flexural Strength (1000 psi) | | Relative Density % of theor. |
|---|---|---|---|---|---|---|---|
| $ZrSiO_4$ | 3 | 6 | 62.4 | ± 14.6 | 111.0 | ± 10.0 | 99+ |
| ZrN | 3 | 6 | — | | 75.8 | ± 5.0 | 97+ |
| ZrC | 3 | 6 | 59.4 | ± 2.6 | 136.8 | ± 9.6 | 99+ |
| ZrC | 15 | 3 | 45.4 | ± 3.9 | 118.2 | ± 10.3 | 99+ |

Ceramic samples prepared by the aforedescribed method were isothermally oxidized at high temperatures. Two compositions were selected for purposes of comparison. The first, the most widely used high temperature ceramic, comprised silicon nitride and 3 weight percent of MgO. The second comprised silicon nitride and 3 weight percent of ZrC.

The samples were abraded through 600 grit SiC paper, measured to determine their geometric surface area, ultrasonically cleaned in acetone and in methanol, weighed prior to insertion in an Ainsworth Series-1000 electrobalance, and reweighed after oxidation. The experiments were performed at 1500° C in static, commercial grade oxygen at 150 torr total pressure. The results, summarized in Table II, show the weight gained per unit area as a function of time.

TABLE II

| Time hr | MgO $\left(\dfrac{\Delta M}{M}\right)^2$ mg/cm$^2$ | ZrC $\left(\dfrac{\Delta M}{A}\right)^2$ mg/cm$^2$ |
|---|---|---|
| 10 | 0.29 | 0.12 |
| 20 | 0.60 | 0.29 |
| 30 | 0.92 | 0.45 |
| 40 | — | 0.61 |

From these tests, it is evident that an improved ceramic is obtained if one of the aforementioned additives is included and if the additive is ZrC, the improvement is considerable. The refractory properties of these bodies indicate that ceramics with a significant high temperature strength have been obtained. As is shown in Table II, the zirconium carbide additive provides greater high temperature oxidation resistance to silicon nitride than does the most widely used additive, magnesium oxide.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A dense and high-temperature-oxidation-resistant ceramic prepared from a mixture consisting of silicon nitride and of zirconium silicate in an amount from 3 to 15 weight percent of said silicon nitride.

* * * * *